United States Patent
Morita et al.

(10) Patent No.: US 9,110,341 B2
(45) Date of Patent: Aug. 18, 2015

(54) LIQUID CRYSTAL DISPLAY DEVICE

(71) Applicants: Yusuke Morita, Saitama-ken (JP); Jin Hirosawa, Saitama-ken (JP); Hitomi Hasegawa, Saitama-ken (JP)

(72) Inventors: Yusuke Morita, Saitama-ken (JP); Jin Hirosawa, Saitama-ken (JP); Hitomi Hasegawa, Saitama-ken (JP)

(73) Assignee: JAPAN DISPLAY INC., Tokyo (JP)

( * ) Notice: Subject to any disclaimer, the term of this patent is extended or adjusted under 35 U.S.C. 154(b) by 273 days.

(21) Appl. No.: 13/749,950

(22) Filed: Jan. 25, 2013

(65) Prior Publication Data

US 2013/0242216 A1    Sep. 19, 2013

(30) Foreign Application Priority Data

Mar. 14, 2012 (JP) ................................. 2012-057482

(51) Int. Cl.
*G02F 1/1343* (2006.01)
*G02F 1/139* (2006.01)
*G02F 1/1337* (2006.01)

(52) U.S. Cl.
CPC .... *G02F 1/134363* (2013.01); *G02F 1/133753* (2013.01); *G02F 1/134336* (2013.01); *G02F 2202/42* (2013.01)

(58) Field of Classification Search
CPC .......... G02F 1/134363; G02F 2202/42; G02F 1/134336; G02F 1/133753
USPC ................... 349/39, 139, 141, 167, 177, 178; 345/92
See application file for complete search history.

(56) References Cited

U.S. PATENT DOCUMENTS

| 5,969,781 | A * | 10/1999 | Matsuyama et al. .......... 349/130 |
| 6,266,116 | B1 | 7/2001 | Ohta et al. |
| 2001/0010575 | A1 | 8/2001 | Yoshida et al. |
| 2004/0165136 | A1 | 8/2004 | Sugiyama et al. |

(Continued)

FOREIGN PATENT DOCUMENTS

| JP | 6-222397 | 8/1994 |
| JP | 7-159807 | 6/1995 |

(Continued)

OTHER PUBLICATIONS

U.S. Appl. No. 13/785,295, filed Mar. 5, 2013, Hasegawa, et al.

(Continued)

*Primary Examiner* — Dung Nguyen
*Assistant Examiner* — Tai Duong
(74) *Attorney, Agent, or Firm* — Oblon, McClelland, Maier & Neustadt, L.L.P.

(57) ABSTRACT

In one embodiment, a first substrate includes a gate line extending in a first direction, a source line extending in a second direction orthogonally crossing the first direction, a sub-pixel electrode extending in the first direction, and a pixel electrode having "n" main pixel electrodes electrically connected with the sub-pixel electrode and extending in the second direction ("n" is positive integer). A second substrate includes a main common electrode extending in the second direction in parallel with the "n" main pixel electrodes, and a liquid crystal layer held between the first and second substrates and including liquid crystal molecules. The dielectric constant anisotropy $\Delta\varepsilon$ of the liquid crystal molecules satisfies a following relational expression with respect to a definition depending on an inter-electrode distance between the main pixel electrode and the main common electrode in the first direction.

$\Delta\varepsilon \geq -0.014 \times (\text{definition}) + (19.7 - 4(n-1))$

15 Claims, 7 Drawing Sheets

(56) References Cited

U.S. PATENT DOCUMENTS

| | | |
|---|---|---|
| 2005/0206824 A1 | 9/2005 | Son et al. |
| 2005/0219453 A1 | 10/2005 | Kubo et al. |
| 2007/0115234 A1 | 5/2007 | Kim et al. |
| 2008/0062358 A1 | 3/2008 | Lee et al. |
| 2008/0180590 A1 | 7/2008 | Lee et al. |
| 2008/0180623 A1 | 7/2008 | Lee et al. |
| 2008/0186439 A1 | 8/2008 | Kwon et al. |

FOREIGN PATENT DOCUMENTS

| | | | |
|---|---|---|---|
| JP | 09-105908 | | 4/1997 |
| JP | 9-160041 | | 6/1997 |
| JP | 9-160042 | | 6/1997 |
| JP | 9-160061 | | 6/1997 |
| JP | 09-230380 | | 9/1997 |
| JP | 10-26765 | | 1/1998 |
| JP | 10-90708 | | 4/1998 |
| JP | 2003-20779 | | 7/2003 |
| JP | 2005-3802 | | 1/2005 |
| JP | 3644653 | | 2/2005 |
| JP | 2005-114982 | * | 4/2005 |
| JP | 2005-242307 | | 9/2005 |
| JP | 2007-047786 | | 2/2007 |
| JP | 2011-209454 | | 10/2011 |

OTHER PUBLICATIONS

U.S. Appl. No. 13/750,198, filed Jan. 25, 2013, Hasegawa, et al.
U.S. Appl. No. 13/763,888, filed Feb. 11, 2013, Hasegawa, et al.
Japanese Office Action for Patent Application No. 2012-057482 issued Apr. 21, 2015 in English translation.

* cited by examiner

LIQUID CRYSTAL DISPLAY DEVICE

CROSS-REFERENCE TO RELATED APPLICATION

This application is based upon and claims the benefit of priority from prior Japanese Patent Application No. 2012-057482 filed Mar. 14, 2012, the entire contents of which are incorporated herein by reference.

FIELD

Embodiments described herein relate generally to a liquid crystal display device.

BACKGROUND

In recent years, a flat panel display is developed briskly. Especially, the liquid crystal display device gets a lot of attention from advantages, such as light weight, thin shape, and low power consumption. In an active matrix type liquid crystal display device equipped with a switching element in each pixel, structures using lateral electric field, such as IPS (In-Plane Switching) mode and FFS (Fringe Field Switching) mode, attract attention. The liquid crystal display device using the lateral electric field mode is equipped with pixel electrodes and a common electrode formed in an array substrate, respectively. Liquid crystal molecules are switched by the lateral electric field substantially in parallel with the principal surface of the array substrate.

On the other hand, another technique is also proposed, in which the liquid crystal molecules are switched using the lateral electric field or an oblique electric field between the pixel electrode formed in the array substrate and the common electrode formed in a counter substrate.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION

A liquid crystal display device according to an exemplary embodiment of the present invention will now be described with reference to the accompanying drawings wherein the same or like reference numerals designate the same or corresponding portions throughout the several views.

According to one embodiment, a liquid crystal display device includes: a first substrate including; a gate line and an auxiliary capacitance line respectively extending in a first direction, a source line extending in a second direction orthogonally crossing the first direction, a switching element electrically connected with the gate line and the source line, a pixel electrode including a sub-pixel electrode electrically connected with the switching element and extending in the first direction in the shape of a belt, and "n" main pixel electrodes electrically connected with the sub-pixel electrode and extending in the second direction ("n" is positive integer), a first alignment film covering the pixel electrode, and a second substrate including; a common electrode having a main common electrode extending in the second direction in parallel with the "n" main pixel electrodes, a second alignment film covering the common electrode, and a liquid crystal layer held between the first substrate and the second substrate and including liquid crystal molecules; wherein dielectric constant anisotropy $\Delta\varepsilon$ of the liquid crystal molecules satisfies a following relational expression with respect to a definition depending on an inter-electrode distance between the main pixel electrode and the main common electrode in the first direction.

$$\Delta\varepsilon \geq -0.014 \times (\text{definition}) + (19.7 - 4(n-1))$$

Figure 1:
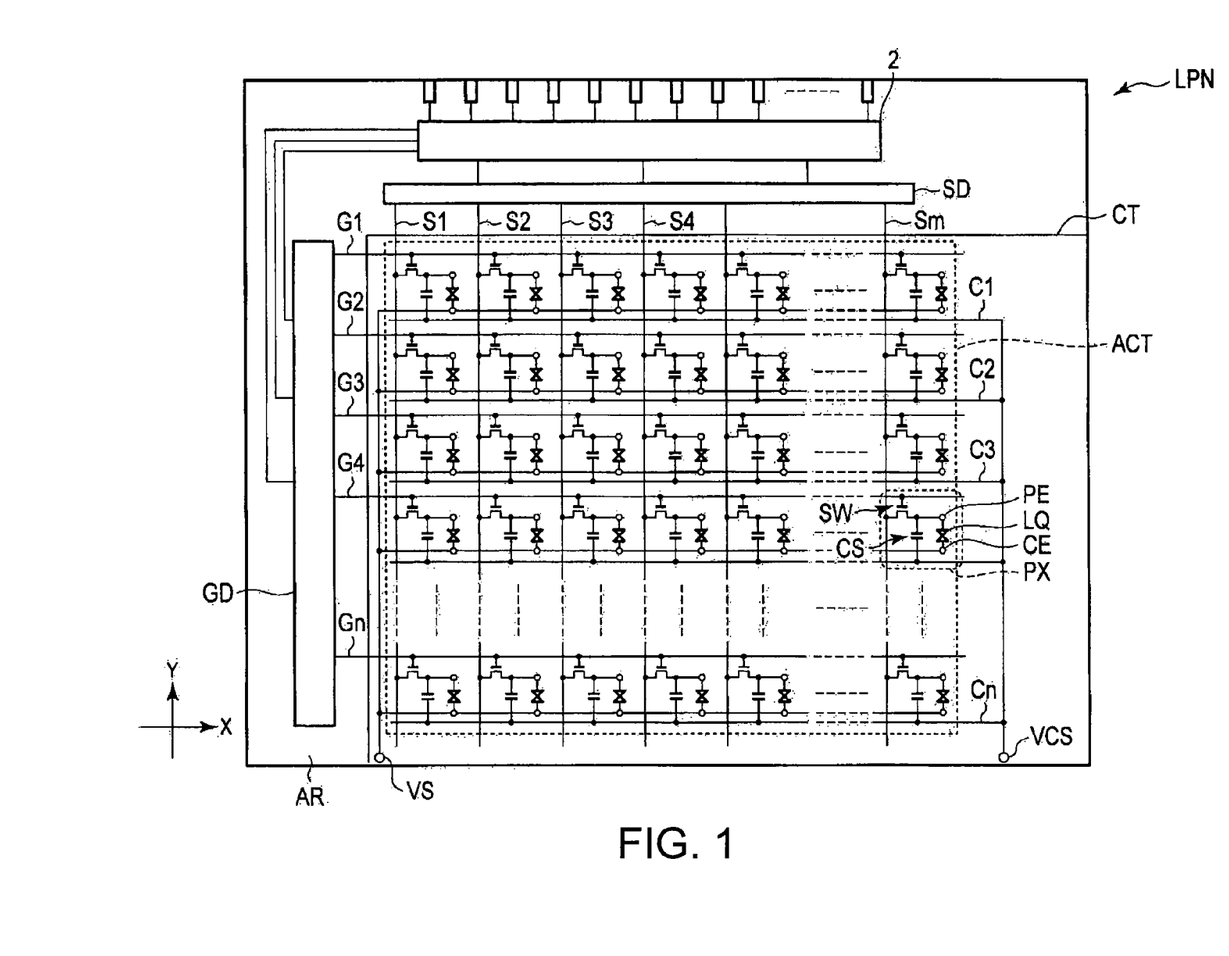
FIG. 1 is a figure schematically showing a structure and the equivalent circuit of a liquid crystal display device according to one embodiment.

FIG. 1 is a figure schematically showing a structure and the equivalent circuit of the liquid crystal display device according to one embodiment.

The liquid crystal display device includes an active-matrix type liquid crystal display panel LPN. The liquid crystal display panel LPN is equipped with an array substrate AR as a first substrate, a counter substrates CT as a second substrate arranged opposing the array substrate AR, and a liquid crystal layer LQ held between the array substrate AR and the counter substrate CT. The liquid crystal display panel LPN includes an active area ACT which displays images. The active area ACT is constituted by a plurality of pixels PX arranged in the shape of a (m×n) matrix (here, "m" and "n" are positive integers).

The liquid crystal display panel LPN is equipped with "n" gate lines G (G1-Gn), "n" auxiliary capacitance lines C (C1-Cn), "m" source lines S (S1-Sm), etc., in the active area ACT. The gate line G and the auxiliary capacitance line C extend in a first direction X, respectively. The gate line G and the auxiliary capacitance line C are arranged in turns along a second direction Y that orthogonally intersects the first direction X. The source lines S cross the gate line G and the capacitance line C. The source lines S extend linearly in the second direction Y, respectively. The gate line G, the auxiliary capacitance line C and the source lines S do not necessarily extend linearly, and a portion thereof may be crooked partially.

Each gate line G is pulled out to outside of the active area ACT is connected to a gate driver GD. Each source line S is pulled out to the outside of the active area ACT and connected to a source driver SD. At least a portion of the gate driver GD and the source driver SD is formed in the array substrate AR, for example, and connected with the driver IC chip 2 provided in the array substrate AR and having an implemented controller.

Each pixel PX includes a switching element SW, a pixel electrode PE, a common electrode CE, etc. Retention capacitance Cs is formed, for example, between the auxiliary capacitance line C and the pixel electrode PE. The auxiliary capacitance line C is electrically connected with a voltage impressing portion VCS to which an auxiliary capacitance voltage is impressed.

In addition, in the liquid crystal display panel LPN according to this embodiment, while the pixel electrode PE is formed in the array substrate AR, at least one portion of the common electrode CE is formed in the counter substrate CT. Liquid crystal molecules of the liquid crystal layer LQ are switched mainly using an electric field formed between the pixel electrode PE and the common electrode CE. The electric field formed between the pixel electrode PE and the common electrode CE is lateral electric field substantially in parallel with the principal surface of the array substrate AR or the counter substrate CT, or an oblique electric field slightly oblique with respect to the principle surfaces of the substrates.

The switching element SW is constituted by an n channel type thin film transistor (TFT), for example. The switching element SW is electrically connected with the gate line G and the source line S. The (m×n) switching elements SW are formed in the active area ACT. The switching element SW may be either a top-gate type or a bottom-gate type. Though the semiconductor layer is formed of poly-silicon, the semiconductor layer may be formed of amorphous silicon.

The pixel electrode PE is arranged in each pixel and electrically connected with the switching element SW. The common electrode CE is arranged in common to the plurality of pixel electrodes PE through the liquid crystal layer LQ. Though the pixel electrode PE and the common electrode CE are formed by light transmissive conductive material such as Indium Tin Oxide (ITO), Indium Zinc Oxide (IZO), etc., other metals such as aluminum may be used.

The array substrate AR includes an electric power supply portion VS formed outside of the active area ACT for impressing a voltage to the common electrode CE. Furthermore, the common electrode CE is drawn to outside of the active area ACT and electrically connected with an electric power supply portion VS formed in the array substrate AR through an electric conductive component which is not illustrated.

Figures 2A, 2B, 2C, 2D, 2E:
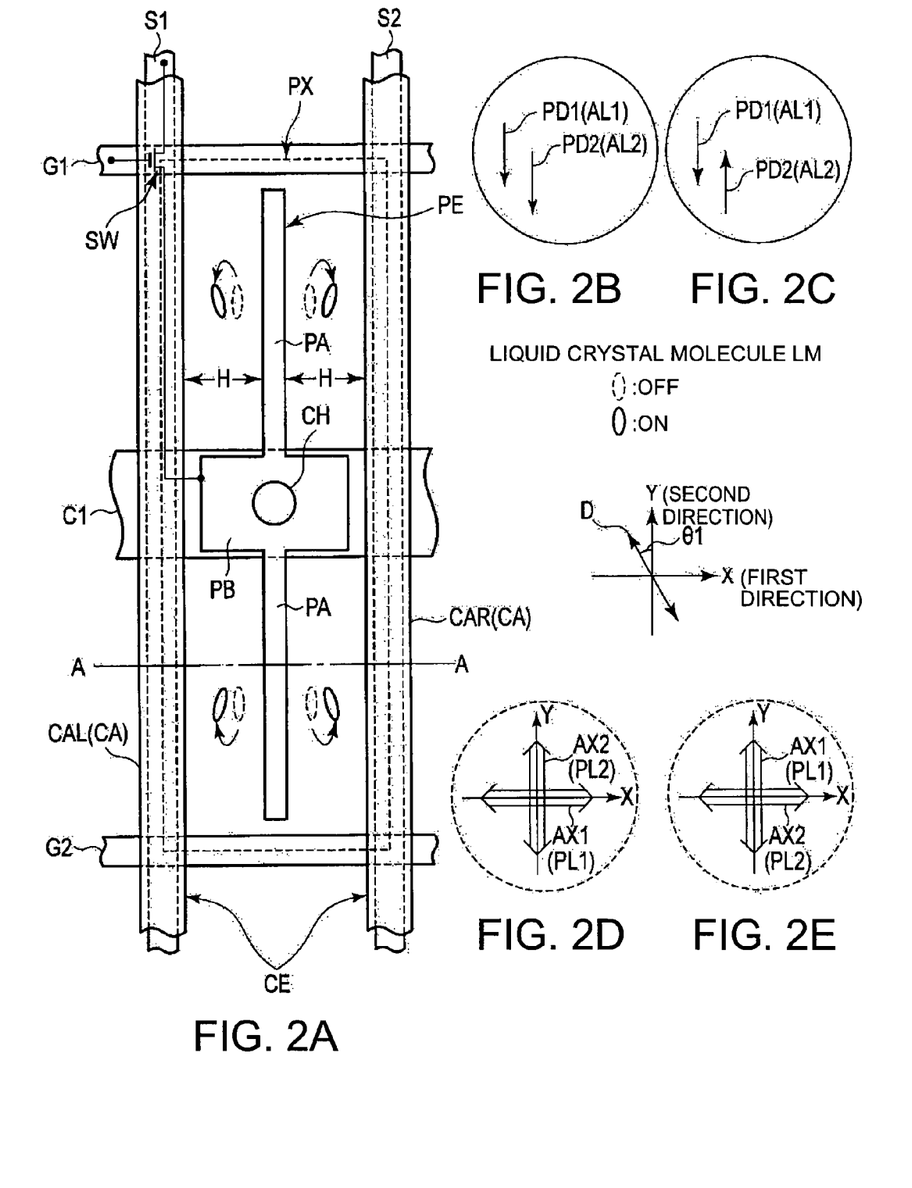
FIG. 2A is a plan view schematically showing a structure of one pixel when a display panel shown in FIG. 1 is seen from a counter substrate side according to a first embodiment.
FIGS. 2B and 2C are views showing alignment treatment directions.
FIGS. 2D and 2E are views showing polarizing axis of polarization plates.

FIG. 2A is a plan view schematically showing the structure of one pixel when the liquid crystal display panel according to a first embodiment is seen from the counter substrate side. Herein, a plan view in a X-Y plane specified in the first direction X and the second direction Y is shown.

The gate line G1, the gate line G2, and the auxiliary capacitance line C1 extend along the first direction X, respectively. The source line S1 and source line S2 extend along the second direction Y, respectively. The auxiliary capacitance line C1 is located substantially in the middle between the gate line G1 and the gate line G2. That is, the distance between the gate line G1 and the auxiliary capacitance line C1 in the second direction Y is substantially the same as that between the gate line G2 and the auxiliary capacitance line C1 in the second direction Y.

In this embodiment, the pixel PX corresponds to a square formed of the gate line G1, the gate line G2, the source line S1, and the source line S2 and has a shape of a rectangle whose length in the second direction Y is longer than that in the first direction X, as shown by a dashed line in the figure. The length of the pixel PX in the first direction X corresponds to a pitch in the first direction X between the source line S1 and the source line S2, and the length in the second direction Y of the pixel PX corresponds to the pitch in the second direction Y between the gate line G1 and the gate line G2. The pixel electrode PE is arranged between adjoining source line S1 and source line S2. Moreover, this pixel electrode PE is located between the gate line G1 and the gate line G2.

In this embodiment, the source line S1 is arranged at the left-hand side end in the pixel PX. Precisely, the source line S1 is arranged striding over a boundary between the illustrated pixel and a pixel PX adjoining the illustrated pixel PX on the left-hand side. The source line S2 is arranged at the right-hand side end. Precisely, the source line S2 is arranged striding over a boundary between the illustrated pixel and a pixel PX adjoining the illustrated pixel PX on the right-hand side. Moreover, in the pixel PX, the gate line G1 is arranged at an upper end portion. Precisely, the gate line G1 is arranged striding over a boundary between the illustrated pixel and a pixel which adjoins the illustrated pixel PX on its upper end side. The gate line G2 is arranged at a lower end portion. Precisely, the gate line G2 is arranged striding over a boundary between the illustrated pixel and a pixel which adjoins the illustrated pixel PX on its lower end side. The auxiliary capacitance line C1 is arranged approximately in a central portion of the pixel PX.

The switching element SW is electrically connected with the gate line G1 and the source line S1 in the illustrated example. Namely, the switching element SW is formed in an intersection of the gate line G1 with the source line S1. A drain line extends along the source line S1 and the auxiliary capacitance line C1, and is electrically connected with the pixel electrode PE through a contact hole CH formed in a region which overlaps with the auxiliary capacitance line C1. The switching element SW hardly runs off the overlapped region with the source line S1 and the auxiliary capacitance line C1. Thereby, reduction of the area of an aperture which contributes to a display is suppressed when the switching element SW is formed in the pixel PX.

The pixel electrode PE is equipped with "n" main pixel electrodes PA and sub-pixel electrodes PB ("n" is a positive integer). The pixel electrode PE is equipped with one main pixel electrode PA in this embodiment. The main pixel electrodes PA and the sub-pixel electrode PB are formed integrally or continuously, and electrically connected mutually. In addition, although only the pixel electrode PE arranged in one PX is illustrated in the figure, the pixel electrode of the same form is arranged about other pixels which are not illustrated.

The main pixel electrode PA extends along the second direction Y, and is formed in the shape of a belt having a predetermined width along the first direction X. The main pixel electrode PA is located approximately in the center between the source line S1 and the source line S2. That is, the distance between the source line S1 and the main pixel electrode PA in the first direction X is substantially the same as that between the source line S2 and the main pixel electrode PA in the first direction X.

The sub-pixel electrode PB is formed in the shape of a belt extending along the first direction X. In this embodiment, the sub-pixel electrode PB crosses the main pixel electrode PA in the intermediate portion thereof in the second direction Y. The sub-pixel electrode PB linearly extends toward the source line S1 and the source line S2, respectively from the intersection portion of the main pixel electrode PA. That is, the pixel electrode PE shown here is formed in the shape of a cross.

Moreover, in this embodiment, the sub-pixel electrode PB is located on the auxiliary capacitance line C1. That is, the whole sub-pixel electrode PB is located in a region which overlaps with the auxiliary capacitance line C1. The sub-pixel electrode PB is electrically connected with the switching element SW through the contact hole CH.

The common electrode CE is equipped with a main common electrode CA. The main common electrodes CA linearly extend along the second direction Y in parallel to the main pixel electrode PA on both sides which sandwich the main pixel electrode PA in the X-Y plane. The main common electrode CA is formed in the shape of a belt having the same width in the first direction X.

In the illustrated example, the main common electrode CA is arranged in two lines in the first direction X. Hereinafter, in order to distinguish the two lines, the main common electrode CA on the left-hand side in the figure is called CAL, and the main common electrode on the right-hand side in the figure is called CAR. Precisely, the main common electrode CAL is arranged striding over a boundary between the illustrated pixel and a pixel which adjoins the illustrated pixel PX on the left-hand side. The main common electrode CAR is arranged at the right-hand side end. Precisely, the main common electrode CAR is arranged striding over a boundary between the illustrated pixel and a pixel which adjoins the illustrated pixel PX on the right-hand side. The main common electrode CAL counters with the source line S1, and the main common electrode CAR counters with the source line S2. The main common electrode CAL and the main common electrode CAR are electrically connected in the active area or outside of the active area.

If its attention is paid to the positional relationship between the pixel electrode PE and the common electrode CE in the X-Y plane, the main pixel electrode PA and the main common electrode CA are arranged by turns along the first direction X. That is, one main pixel electrode PA is arranged between the adjoining main common electrode CAL and main common electrode CAR. The main pixel electrode PA is located substantially in the center between main common electrode CAL and main common electrode CAR. Namely, the distances between the main common electrode CAL and the main pixel electrode PA, and between the main common electrode CAR and the main pixel electrode PA are substantially the same in the first direction X.

Figure 3:
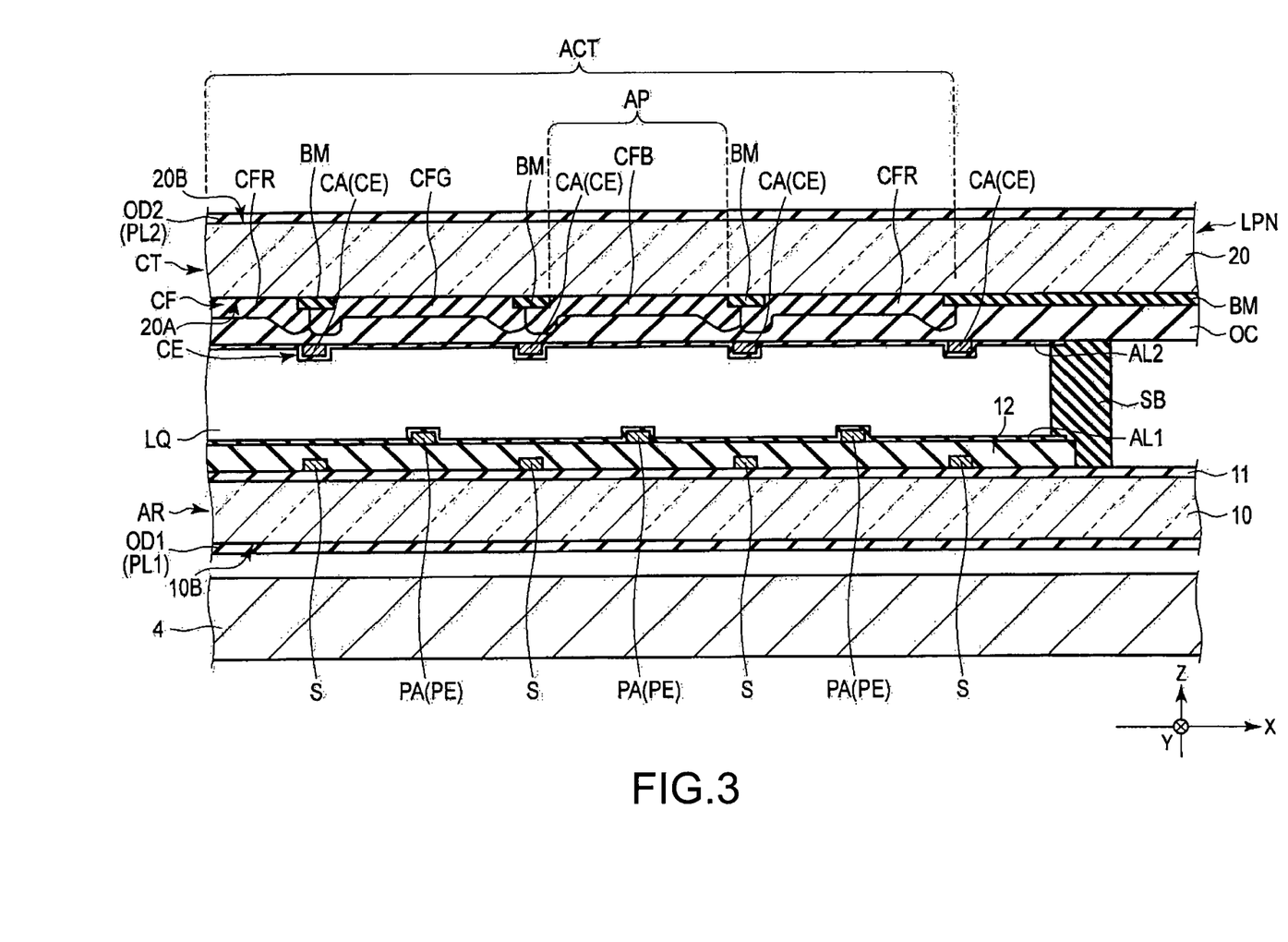
FIG. 3 is a cross-sectional view schematically showing the structure of the liquid crystal display panel taken along line A-A shown in FIG. 2.

FIG. 3 is a cross-sectional view schematically showing the structure of the liquid crystal display panel taken along line A-A shown in FIG. 2. In addition, only the portion required for explanation is illustrated here.

A backlight 4 is arranged on the back side of the array substrate AR in the illustrated example. Various types of backlights can be used. For example, a light emitting diode (LED) and a cold cathode fluorescent lamp (CCFL), etc., can be applied as a light source of the backlight 4, and the explanation about its detailed structure is omitted.

The array substrate AR is formed using a first insulating substrate 10 which has a transmissive characteristics. The source line S is formed on a first interlayer insulating film 11 covered with a second interlayer insulating film 12. In addition, the gate line and the auxiliary capacitance line which are not illustrated are arranged between the first insulating substrate 10 and the first interlayer insulating film 11, for example. The pixel electrode PE is formed on the second interlayer insulating film 12. The pixel electrode PE is located inside of the pixel rather than the position on the respective adjoining source lines S. A first alignment film AL1 is arranged on the array substrate AR facing the counter substrate CT, and extends to whole active area ACT. The first alignment film AL1 covers the pixel electrode PE, etc., and is also arranged on the second insulating layer 12. The first alignment film AL1 is formed of materials which show a horizontal alignment characteristics. In addition, the array substrate AR may be further equipped with a portion of the common electrodes CE.

The counter substrate CT is formed using a second insulating substrate 20 which has a transmissive characteristics. The counter substrate CT includes a black matrix BM, a color filter CF, an overcoat layer OC, the common electrode CE, and a second alignment film AL2, etc.

The black matrix BM is formed on the second insulating substrate 20 defining each pixel PX, and forms an aperture portion AP facing the pixel electrode PE. That is, the black matrix BM is arranged so that line portions, such as the source line S, the gate line G, the auxiliary capacitance line C1, and the switching element SW, may counter the black matrix BM. Herein, though only a portion of the black matrix BM extending along the second direction Y is shown, the black matrix BM may includes a portion extending along the first direction X. The black matrix BM is formed on an internal surface 20A of the second insulating substrate 20 facing the array substrate AR.

The color filter CF is arranged corresponding to each pixel PX. That is, while the color filter CF is arranged in the aperture portion AP in the internal surface 20A of the second insulating substrate 20, a portion thereof runs on the black matrix BM. The colors of the color filters CF arranged in adjoining pixels PX in the first direction X differ mutually. For example, the color filters CF are formed of resin materials colored by three primary colors of red, blue, and green, respectively. The red color filter CFR formed of resin material colored in red is arranged corresponding to the red pixel. The blue color filter CFB formed of resin material colored in blue is arranged corresponding to the blue pixel. The green color filter CFG formed of resin material colored in green is arranged corresponding to the green pixel. The boundary between the adjoining color filters CF is located in a position which overlaps with the black matrix BM. The overcoat layer OC covers the color filter CF. The overcoat layer OC eases influence of concave-convex of the surface of the color filter CF. The overcoat layer OC is formed of transparent material.

The common electrode CE is formed on the overcoat layer OC facing the array the substrate AR. The main common electrode CA is located above the source line S. The second alignment film AL2 is arranged on the counter substrate CT facing the array substrate AR, and extends to whole active area ACT. The second alignment film AL2 covers the common electrode CE, the overcoat layer OC, etc. The second alignment film AL2 is formed of materials which show horizontal alignment characteristics.

An alignment treatment (for example, rubbing processing or light alignment processing) is performed to the first alignment film AL1 and the second alignment film AL2 to initially align the molecules of the liquid crystal layer LQ. A first alignment treatment direction PD1 in which the first alignment film AL1 initially aligns the molecules is in parallel with a second alignment treatment direction PD2 in which the second alignment film AL2 initially aligns the molecules. For example, in FIG. 2B, the first alignment treatment direction PD1 and the second alignment treatment direction PD2 are in parallel with the second direction Y and are the same directions each other. In FIG. 2C, the first alignment treatment direction PD1 and the second alignment treatment direction PD2 are in parallel with the second direction Y and are the opposite directions each other.

The array substrate AR and the counter substrate CT as mentioned-above are arranged so that the first alignment film AL1 and the second alignment film AL2 face each other. In this case, a pillar-shaped spacer is formed integrally with one of the substrates by resin material between the first alignment film AL1 on the array substrate AR and the second alignment film AL2 on the counter substrate CT. Thereby, a predetermined gap, for example, a 2-7 μm cell gap is formed. The array substrate AR and the counter substrate CT are pasted together by seal material SB arranged outside the active area ACT while the predetermined cell gap is formed.

The liquid crystal layer LQ is held at the cell gap formed between the array substrate AR and the counter substrate CT, and is arranged between the first alignment film AL1 and the second alignment film AL2. The liquid crystal layer LQ contains the liquid crystal molecule which is not illustrated. The liquid crystal layer LQ is constituted by positive type liquid crystal material.

A first optical element OD1 is attached on an external surface 10B of the array substrate AR, i.e., the external surface of the first insulating substrate 10 which constitutes the array substrate AR, by adhesives, etc. The first optical element OD1 is located in a side which counters with the backlight 4 of the liquid crystal display panel LPN, and controls the polarization state of the incident light which enters into the liquid crystal display panel LPN from the backlight 4. The first optical element OD1 includes a first polarization plate PL1 having a first polarizing axis (or first absorption axis) AX1. In addition, other optical elements such as a retardation film may be arranged between the first polarization plate PL1 and the first insulating substrate 10.

A second optical element OD2 is attached on an external surface 20B of the counter substrate CT, i.e., the external surface of the second insulating substrate 20 which constitutes the counter substrate CT, by adhesives, etc. The second optical element OD2 is located in a display surface side of the liquid crystal display panel LPN, and controls the polarization state of emitted light from the liquid crystal display panel LPN. The second optical element OD2 includes a second polarization plate PL2 having a second polarizing axis (or second absorption axis) AX2. In addition, other optical elements such as a retardation film may be arranged between the second polarization plate PL2 and the second insulating substrate 20.

The first polarization axis AX1 of the first polarizing plate PL1 and the second polarizing axis AX2 of the second polarization plate PL2 are in the positional relationship of Cross Nicol. In this state, one alignment plate is arranged so that the polarizing axis becomes in parallel with or orthogonally crosses the initial alignment direction of the liquid crystal molecules. In FIG. 2D, the first polarization plate PL1 is arranged so that the first polarizing axis AX1 crosses the second direction Y i.e., the initial alignment direction of the liquid crystal molecules LM, and the second polarization plate PL2 is arranged so that the second polarizing axis AX2 becomes in parallel with the second direction Y. In FIG. 2E, the second polarization plate PL2 is arranged so that the second polarizing axis AX2 orthogonally crosses the second direction Y, and the first polarization plate PL1 is arranged so that the first polarizing axis AX1 becomes in parallel with the second direction Y.

The operation of the liquid crystal display panel LPN of the above-mentioned structure is explained referring to FIGS. 2A, 2B, 2C, 2D, 2E, 3, and 4.

At the time of non-electric field state, i.e., when a potential difference (i.e., electric field) is not formed between the pixel electrode PE and the common electrode CE, the liquid crystal molecules LM of the liquid crystal layer LQ are aligned so that their long axis are aligned in a parallel direction with the first alignment direction PD1 of the first alignment film AL1 and the second alignment direction PD2 of the second alignment film AL2 as shown with a dashed line in the figure. In this state, the time of OFF corresponds to the initial alignment state, and the alignment direction of the liquid crystal molecule LM corresponds to the initial alignment direction.

In addition, precisely, the liquid crystal molecules LM are not exclusively aligned in parallel with a X-Y plane, but are pre-tilted in many cases. For this reason, the precise direction of the initial alignment is a direction in which an orthogonal projection of the alignment direction of the liquid crystal molecule LM at the time of OFF is carried out to the X-Y plane. However, in order to explain simply hereinafter, the liquid crystal molecule LM is assumed that the liquid crystal molecule LM is aligned in parallel with the X-Y plane, and is explained as what rotates in a field in parallel with the X-Y plane.

Here, both of the first alignment treatment direction PD1 of the first alignment film AL1 and the second alignment treatment direction PD2 of the second alignment film AL2 are directions in parallel to the second direction Y. At the time of OFF, the long axis of the liquid crystal molecule LM is aligned substantially in parallel to the second direction Y as shown with the dashed line in the figure. That is, the direction of the initial alignment of the liquid crystal molecule LM is in parallel to the second direction Y, or makes an angle of 0° with respect to the second direction Y.

When the respective first alignment treatment direction PD1 and second alignment treatment direction PD2 are in parallel and the same directions each other, the liquid crystal molecule LM is aligned with approximately horizontal direction (i.e., the pre tilt angle is approximately zero) in a cross-section of the liquid crystal layer LQ in the intermediate portion of the liquid crystal layer LQ. The liquid crystal molecule LM is aligned with the pre-tilt angle so that the alignment of the liquid crystal molecule LM near the first alignment film AL1 and the second alignment film AL2 becomes symmetrical with respect to the intermediate portion of the liquid crystal layer LQ (splay alignment). Thus, in the splay alignment state, the display is optically compensated even in an inclining direction from the normal line of the substrate by the liquid crystal molecules LM near the first alignment film AL1 and the second alignment film AL2. Therefore, when the respective first alignment treatment direction PD1 and second alignment treatment direction PD2 are in parallel and the same directions each other, there are few optical leaks in a black display. Accordingly, a high contrast ratio can be realized, and it becomes possible to improve display grace.

In addition, when both of the first and second alignment treatment directions PD1 and PD2 are in parallel, and are opposite directions each other, the liquid crystal molecule LM is aligned so that the liquid crystal molecule LM is aligned with an approximately uniform pre-tilt angle near the first and second alignment films AL1 and AL2 and in the intermediate portion of the liquid crystal layer LQ (homogeneous alignment).

A portion of the backlight from the backlight 4 penetrates the first polarizing plate PL1, and enters into the liquid crystal display panel LPN. The entered light to the liquid crystal display panel LPN is linearly polarized light orthogonally crossing the first polarizing axis AX1 of the first polarization plate PL1. The linearly polarized state of the entered light does not change with the alignment state of the liquid crystal molecule LM when the light passes the liquid crystal layer LQ at the time OFF. Therefore, the lineally polarized light which penetrates the liquid crystal display panel LPN is absorbed by the second polarization plate PL2 arranged in a Cross Nicol state (black display).

On the other hand, in case potential difference (or electric field) is formed between the pixel electrode PE and the common electrode CE, i.e., at the time of ON, the lateral electric field (or oblique electric field) is formed in parallel with the substrates between the pixel electrode PE and the common electrode CE. The liquid crystal molecule LM is affected by the electric field between the pixel electrode PE and the common electrode CE, and the long axis rotates in parallel with the X-Y plane as shown in a solid line in the figure.

In the embodiment shown in FIG. 2A, in the region between the pixel electrode PE and the main common electrode CAL, the liquid crystal molecule LM in the lower half region rotates clockwise to the second direction Y, and aligns so that it may turn to the lower left in the figure. The liquid crystal molecule LM in the upper half region rotates counter-clockwise to the second direction Y, and aligns so that it may turn to the upper left in the figure. On the other hand, in the region between the main pixel electrode PA and the main common electrode CAR, the liquid crystal molecule LM in the lower half region rotates counter-clockwise to the second direction Y, and aligns so that it may turn to the lower right in the figure. The liquid crystal molecule LM in the upper half region rotates clockwise to the second direction Y, and aligns so that it may turn to the upper right in the figure.

Thus, in each pixel PX, in case electric field is formed between the pixel electrode PE and the common electrode CE, the alignment direction of the liquid crystal molecule LM is divided into a plurality of directions by the position which overlaps with the pixel electrode PE and the common electrode CE, and domains are formed in each alignment direction. That is, a plurality of domains is formed in one pixel PX.

At the time of ON, the linearly polarized light orthogonally crossing the first polarizing axis AX1 of the first polarization plate PL1 enters in the liquid crystal panel LPN and the polarization state of the backlight changes in accordance with the alignment state of the liquid crystal molecule LM when passing the liquid crystal layer LQ. At the time of ON, at least a portion of the light which passes the liquid crystal layer LQ penetrates the second polarization plate PL2 (white display).

Figure 4:
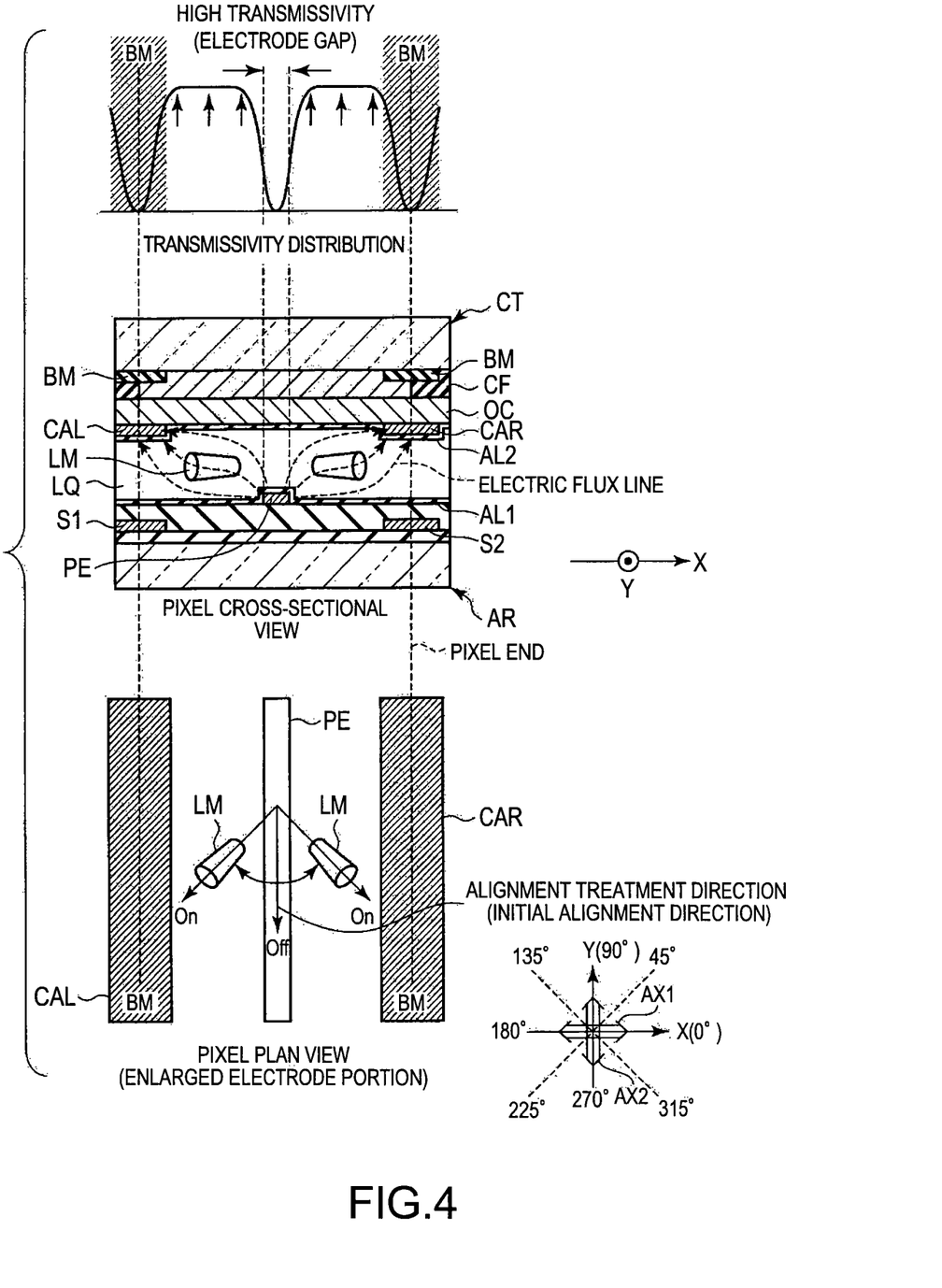
FIG. 4 is a cross-sectional view showing electric field between a pixel electrode and a common electrode in the liquid crystal display panel shown in FIG. 2, and a relationship between a director and a transmissivity of liquid crystal molecules by the electric field.

FIG. 4 is a cross-sectional view showing electric field between a pixel electrode PE and a common electrode CE in the liquid crystal display panel LPN shown in FIG. 2A, and a relationship between a director and a transmissivity of liquid crystal molecules by the electric field.

In the OFF state, the liquid crystal molecule LM is aligned in a direction in parallel to the second direction Y. In the ON state in which potential difference is formed between the pixel electrode PE and the common electrode CE, in case the director (or the direction of the long axis) of the liquid crystal molecule LM shifts by approximately 45° with respect to the first polarizing axis (or absorption axis) AX1 of the first polarization plate PL1 and the second polarizing axis (or absorption axis) AX2 of the second polarization plate PL2, an optical modulation rate of the liquid crystal molecules becomes the highest. That is, the transmissivity becomes the highest in the aperture portion.

In the illustrated example, peak transmissivity is obtained in the ON state when the director of the liquid crystal molecule LM between the main common electrode CAL and the pixel electrode PE becomes a direction substantially in parallel to a direction of 45° to 225°, and the director of the liquid crystal molecule LM between the main common electrode CAR and the pixel electrode PE becomes a direction substantially in parallel to a direction of 135° to 315° within the X-Y plane by the electric field between the pixel electrode PE and the common electrode CE. In addition, the transmissivity in the aperture portion becomes smallest when the director of the liquid crystal molecule LM becomes substantially in parallel with a direction of 0° to 180° or a direction of 90° to 270° in the X-Y plane.

That is, when the rotation angle within the X-Y plane of the liquid crystal molecule LM is 45°, the largest transmissivity is obtained, and even if it is when the rotation angle is smaller than 45° or larger than 45°, the transmissivity falls. Therefore, when a driving voltage (white voltage) by which the rotation angle of the liquid crystal molecule LM becomes 45° is impressed, the maximum luminosity is obtained in the pixel PX. When larger or smaller driving voltage than the white voltage is impressed, the luminosity of the pixel PX is less than the maximum luminosity.

In the ON state, if its attention is paid to a transmissivity distribution in each pixel, the liquid crystal molecule LM hardly rotates from the initial alignment direction on the pixel electrode PE and the common electrode CE. That is, the director of the liquid crystal molecule LM becomes substantially in parallel with the direction of 90° to 270°. For this reason, while the transmissivity becomes the minimum (substantially zero) on the electrodes, high transmissivity is obtained in the electrode gap between the pixel electrode PE and the common electrode CE over the whole gap.

In addition, the main common electrode CAL located above the source line S1 and main common electrode CAR located above the source line S2 respectively counter with the black matrix BM. The widths of the main common electrodes CAL and the main common electrode CAR are equal to or less than the width of the black matrix BM in the first direction X, and the main common electrodes CAL and the main common electrode CAR do not extend to the pixel electrode PE side beyond the black matrix BM. For this reason, the aperture portion which contributes to the display corresponds to regions between the pixel electrode PE and the main common electrode CAL, and between the pixel electrode PE and the main common electrode CAR among the regions between the black matrixes BM or between the source line S1 and the source line S2.

Moreover, since high transmissivity is obtained in the electrode gap between the pixel electrode PE and the common electrode CE according to this embodiment, it becomes possible to correspond by expanding the inter-electrode distance between the pixel electrode PE and the main common electrodes CAL and CAR in order to make transmissivity of each pixel high enough. Moreover, in the product specifications in which the pixel pitch differs each other, the same effect as the above mentioned embodiment can be acquired by changing the inter-electrode distance and using the peak condition of the transmissivity distribution. That is, in the display mode according to this embodiment, it becomes possible to supply the display device having various pixel pitches by setting up inter-electrode distance between the main pixel electrode and main common electrode corresponding to the product specification from low resolution with a comparatively large pixel pitch to high resolution with a comparatively small pixel pitch without necessarily using microscopic processing. Therefore, it becomes possible to realize the demand for high transmissivity and high resolution easily.

Moreover, if its attention is paid to the transmissivity distribution in the region which overlaps with the black matrix BM, the transmissivity fully falls. This is because the leak of electric field does not occur outside of the pixel from the common electrode CE, and undesired lateral electric field is not produced between the adjoining pixels on the both sides of the black matrix BM. That is, it is because the liquid crystal molecule of the region which overlaps with the black matrix BM maintains the state of the initial alignment like at the OFF time (or the time of the black display). Therefore, even if it is a case where the colors of the color filter differ between the adjoining pixels, it becomes possible to control the generating of mixed colors, and also becomes possible to control the fall of color reproducibility and the contrast ratio.

Moreover, when an assembling shift occurs between the array substrate AR and the counter substrate CT, a difference may arises in distances between the respective common electrodes CE of the both sides and the pixel electrode PE. However, the alignment shift is produced in common to all the pixels PX, there is no difference in the electric field distribution between the pixels PX, and the influence to the display of the image is negligible. Even if the assembling shift arises between the array substrate AR and the counter substrate CT, it becomes possible to control the undesirable electric field leak to the adjoining pixels. For this reason, even if it is in a case where the color of the color filter differs between the adjoining pixels, it becomes possible to control generating of mixed colors, and also becomes possible to realize more genuine color reproducibility nature.

In this embodiment, the main common electrode CAR and the main common electrode CAL counter with the source lines S, respectively. In the case, the main common electrode CAL and the main common electrode CAR are arranged above the source line S1 and the source line S2, respectively, the aperture portion AP which contributes to the display can be expanded as compared with the case where the second main common electrode CAL and the second main common electrode CAR are arranged on the main pixel electrode PA side rather than above the source line S1 and the source line S2, and it becomes possible to improve the transmissivity of the pixel PX.

Moreover, it becomes possible to expand the distances between the pixel electrode PE and the second main common electrode CAL, and between the pixel electrode PE and the second main common electrode CAR by arranging each of the second main common electrodes CAL and the second main common electrode CAR above the source line S1 and the source line S2, respectively, and also becomes possible to form more horizontal electric field closer to the horizontal direction. For this reason, it becomes possible also to maintain the wide viewing angle which is advantages of the general IPS mode.

Moreover, according to this embodiment, it becomes possible to form a plurality of domains in each pixel. For this reason, the viewing angle can be optically compensated in a plurality of directions, and wide viewing angle is attained.

In addition, in the above-mentioned example, the case where the alignment direction of the liquid crystal molecule LM is in parallel to the second direction Y is explained. However, the initial alignment direction of the liquid crystal molecule LM may be the oblique direction D which obliquely crosses the second direction Y as shown in FIG. 2A. Herein, the angle θ1 which the initial alignment direction D makes with the second direction Y is larger 0° and smaller than 45°. In addition, it is extremely effective to set the angle θ1 in the range of 5° to 30°, more desirably less than 20° in a viewpoint of the alignment control of the liquid crystal molecule LM. That is, it is desirable that the initial alignment direction of the liquid crystal molecule LM is set to a direction substantially in parallel with a direction in the range of 0° to 20° with respect to the second direction Y.

Moreover, although the above-mentioned example explains the case where the liquid crystal layer LQ has positive dielectric constant anisotropy, the liquid crystal layer LQ may have negative dielectric constant anisotropy. Although detailed explanation is omitted, when the negative type liquid crystal material is used, it is desirable that the above-mentioned angle θ1 is made in a range of 45° to 90° and desirably in a range 70° to 90° because the dielectric constant anisotropy has a contrast relation between the positive type and the negative type.

Furthermore, even at the time of ON, since the lateral electric field is hardly formed (or sufficient electric field to drive the liquid crystal molecule LM is not formed) on the pixel electrode PE or the common electrode CE, the liquid crystal molecule LM hardly moves from the initial alignment direction like at the time of OFF. For this reason, as mentioned-above, even if the pixel electrode PE and the common electrode CE are formed of the electric conductive material with the light transmissive characteristics in these domains, the backlight hardly penetrates, and hardly contributes to the display at the time of ON. Therefore, the pixel electrode PE and the common electrode CE is not necessarily needed to be formed of a transparent electric conductive material, and may be formed using non-transparent electric conductive materials, such as aluminum (Al), silver (Ag), and copper (Cu).

In this embodiment, the inventors found out a correlation between the dielectric constant anisotropy $\Delta \in$ of the liquid crystal layer LQ and the definition of the active area.

Herein, the definition (ppi) is defined as the number of pixels arranged per 1 inch (2.54 cm) in length. However, the minimum unit of the active area for displaying color images is formed of three sub-pixels such as a red sub-pixel PXR, a green sub-pixel PXG, and a blue sub-pixel PXB, and the three sub-pixels are located in a line in the first direction X. Therefore, the definition in this embodiment is defined as the number of the unit pixels arranged per inch in length. In addition, the unit pixel is formed of a square shape in which the length along the first direction X is substantially the same as that in the second direction Y. Each sub-pixel is formed substantially in the same shape. That is, one sub-pixel is formed in the shape of a rectangle extending in the second direction Y, and the length along the second direction Y is about 3 times longer than that along the first direction X.

The higher the definition becomes, the shorter the length in the first direction X of the unit pixel becomes, and the length along the first direction X of the sub-pixel also becomes shorter. On the contrary, the lower the definition becomes, the longer the length in the first direction X of the unit pixel becomes, and the length along the first direction X of the sub-pixel also becomes shorter. When the pixel electrode PE having one main pixel electrode PA (n=1) is used, the length of the sub-pixel forming the low definition pixel PX in the first direction X is expanded. That is, the inter electrode distance H between the main pixel electrode PA and the main common electrode CA in the first direction X is also expanded.

According to this embodiment, the liquid crystal molecule LM is controlled using electric field between the pixel electrode PE and the common electrode CE. When the inter electrode distance H in the first direction X between the main pixel electrode PA and the main common electrode CA is large, a large driving voltage is impressed between the pixel electrode PE and the common electrode CE in order to form electric field required for driving the liquid crystal molecule LM.

Then, the inventors paid their attentions to a dielectric constant anisotropy Δ∈ of the liquid crystal layer LQ. The dielectric constant anisotropy Δ∈ of the liquid crystal layer LQ is defined as follows.

Δ∈=(dielectric constant in the long axis direction of the liquid crystal molecule)−(dielectric constant in the short axis direction of the liquid crystal molecule)

The dielectric constant anisotropy is regarded as the sensitivity of the liquid crystal layer LQ to the electric field, and the liquid crystal molecule LM can be driven by smaller electric field with increase in dielectric constant anisotropy. That is, it is possible to drive the liquid crystal molecule LM by impressing comparatively small driving voltage to the liquid crystal layer LQ with high dielectric constant anisotropy, even if the inter electrode distance H is large (in case of low definition display).

The inventors performed following simulations in order to acquire the correlation between the dielectric constant anisotropy and the definition of the display. That is, a white voltage impressed between the pixel electrode PE and the common electrode CE was set constant. The dielectric constant anisotropy required to obtain fixed luminosity was computed with respect to the definition (ppi) of the display depending on the inter electrode distance H between the main pixel electrode PA and the main common electrode CA in the first direction X.

Figure 5:
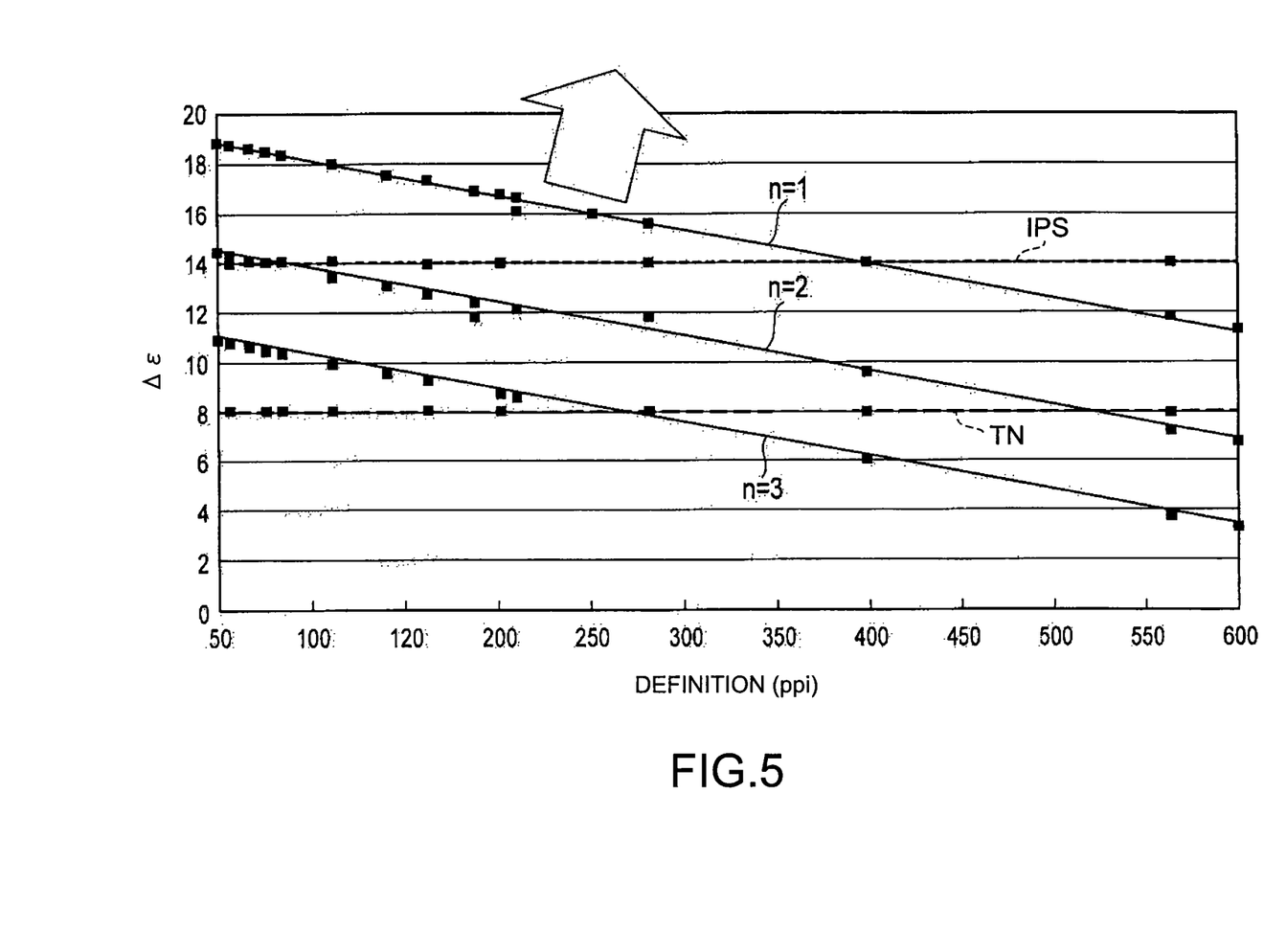
FIG. 5 is a view showing a relationship between dielectric anisotropy of liquid crystal molecules and definition of a display.

FIG. 5 is a figure showing the correlation between the dielectric constant anisotropy and the definition of the display.

The horizontal axis in the figure shows the definition, and the vertical axis shows the dielectric constant anisotropy. In addition, in FIG. 5, the relation between the dielectric constant anisotropy and the definition in an IPS mode and a TN mode is illustrated as reference, respectively. In the IPS mode and the TN mode, the dielectric constant anisotropy required for the liquid crystal layer LQ is constant with regardless of the definition.

The simulation was performed in case of (n=1) in which one pixel electrode PE is equipped with one main pixel electrode PA in this embodiment. It was found out that the dielectric constant anisotropy Δ∈ with respect to the definition can be approximated by a linear function which is illustrated in the figure. That is, the approximate expression in case of (n=1) is as follows.

Δ∈=−0.014×(definition)+19.7

When the liquid crystal layer LQ with the dielectric constant anisotropy acquired by the approximated expression is applied, required luminosity is obtained by impressing a fixed white voltage. However, when the liquid crystal layer LQ with the dielectric constant anisotropy higher than that obtained by the approximated expression is applied, required luminosity is obtained by impressing a smaller white voltage, and low power consumption is attained. That is, the range of the dielectric constant anisotropy which is permitted in the case of (n=1) is as follows.

Δ∈≥−0.014×(definition)+19.7

Although the pixel structure according to above-mentioned embodiment is explained about the case in which the pixel electrode PE is equipped with one main pixel electrode PA (n=1), the pixel electrode PE may be equipped with two or more main pixel electrodes PA.

Figure 6:
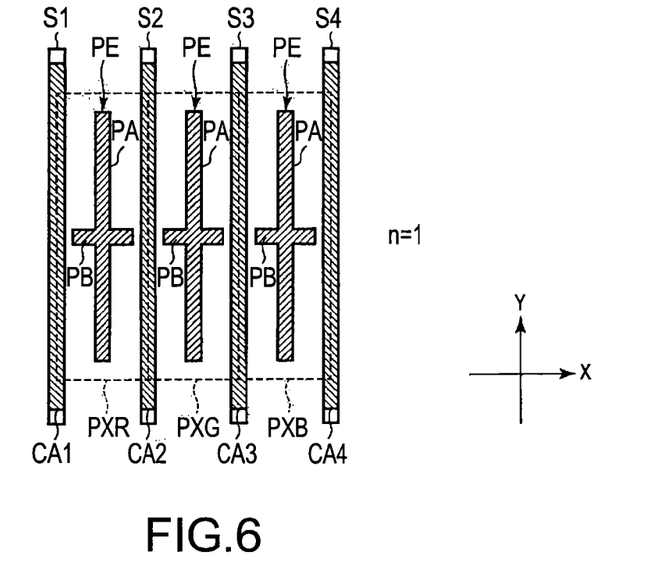
FIG. 6 is a plan view schematically showing the structure of a pixel unit according to a first embodiment.
Figure 7:
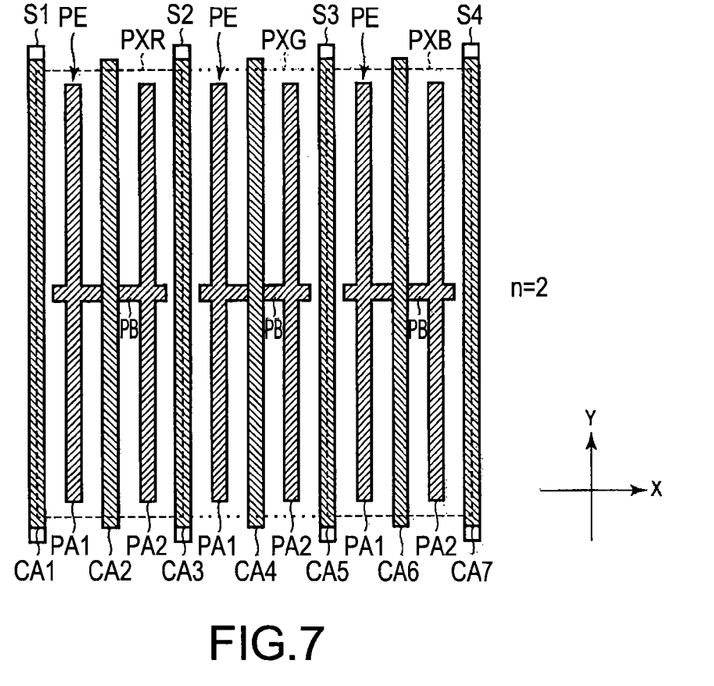
FIG. 7 is a plan view schematically showing the structure of a pixel unit according to a second embodiment.
Figure 8:
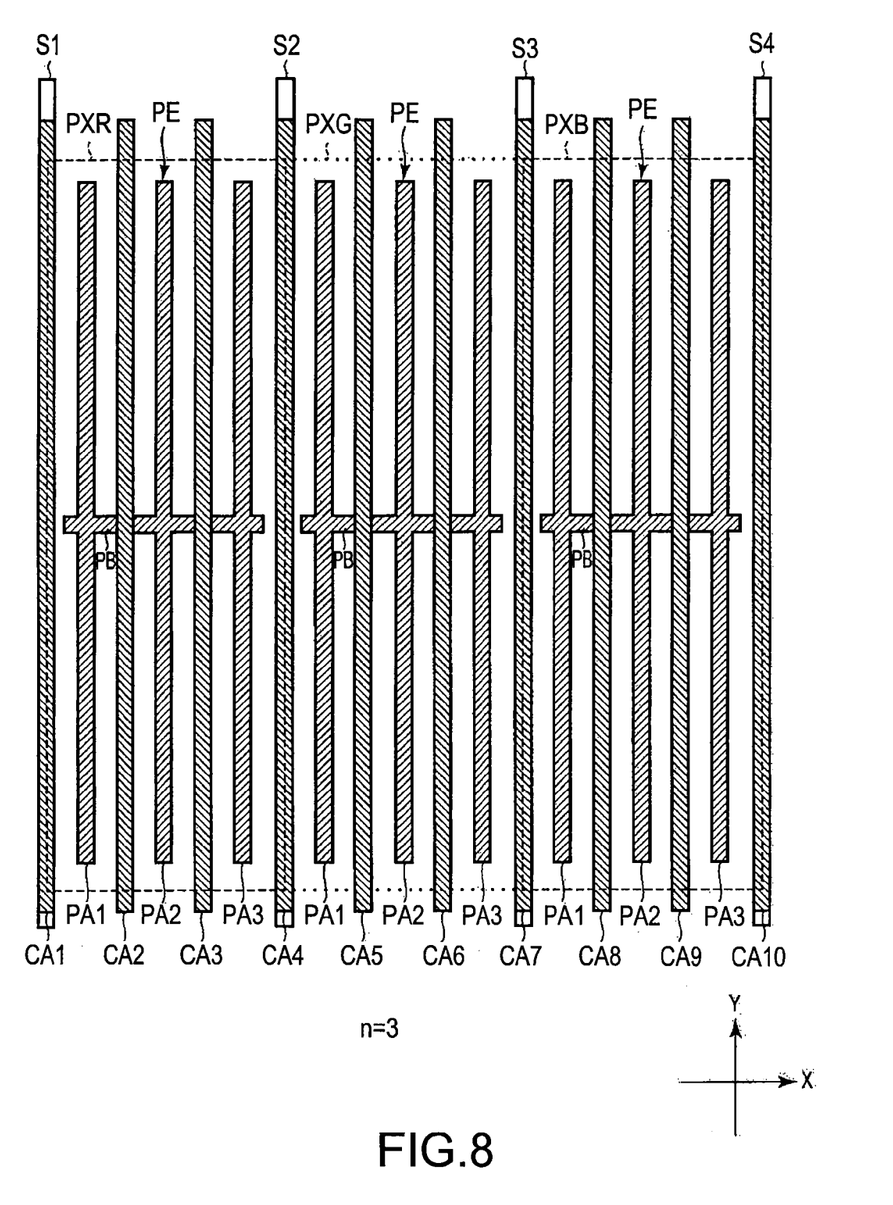
FIG. 8 is a plan view schematically showing the structure of a pixel unit according to a third embodiment.

FIGS. 6, 7 and 8 are plan views schematically showing the structure of the unit pixel according to this embodiment.

The first embodiment shown in FIG. 6 corresponds to the case of (n=1). Namely, the red sub-pixel PXR between a main common electrode CA1 and a main common electrode CA2, the green sub-pixel PXG between the main common electrode CA2 and a main common electrode CA3 and the blue sub-pixel PXB between the main common electrode CA3 and a main common electrode CA4 are equipped with one main pixel electrode PA as the pixel electrode PE, respectively. The main common electrodes CA1 to CA4 are located above the source lines S1 to S4, respectively.

The second embodiment shown in FIG. 7 corresponds to the case of (n=2). Namely, the red sub-pixel PXR between a main common electrode CA1 and a main common electrode CA3, the green sub-pixel PXG between the main common electrode CA3 and a main common electrode CA5 and the blue sub-pixel PXB between the main common electrode CA5 and a main common electrode CA7 are equipped with two main pixel electrodes PA1 and PA2 as the pixel electrode PE, respectively. The two main pixel electrodes PA1 and PA2 are connected by a sub-pixel electrode PB. A main electrode CA2 is located between the main pixel electrode PA1 and the main pixel electrode PA2 of the red sub-pixel PXR, and intersects the sub-pixel electrode PB in the X-Y plane. Also, in the green sub-pixel PXG, a main common electrode CA4 intersects the sub-pixel electrode PB, and a main common electrode CA6 in the blue sub-pixel PXB intersects the sub-pixel electrode PB similarly. The main common electrodes CA1, CA3, CA5 and CA7 arranged in the boundary between the sub-pixels are located above the source lines S1 to S4, respectively.

The third embodiment shown in FIG. 8 corresponds to the case of (n=3). Namely, the red sub-pixel PXR between a main common electrode CA1 and a main common electrode CA4, the green sub-pixel PXG between the main common electrode CA4 and a main common electrode CA7 and a blue sub-pixel PXB between the main common electrode CA7 and a main common electrode CA10 are equipped with three main pixel electrodes PA1 to PA3, respectively. The three main pixel electrodes PA1 to PA3 are connected by a sub-pixel electrode PB. A main electrodes CA2 is located between the main pixel electrode PA1 and the main pixel electrode PA2, a main common electrode CA3 is located between the main pixel electrode PA2 and the main pixel electrode PA3 of the red sub-pixel PXR, and intersect the sub-pixel electrode PB in the X-Y plane, respectively. Also, in the green sub-pixel PXG, main common electrodes CA5 and CA6 intersect the sub-pixel electrode PB, and main common electrodes CA8 and CA9 in the blue sub-pixel PXB intersect the sub-pixel electrode PB, similarly. The main common electrodes CA1, CA4, CA7 and CA10 arranged in the boundary between sub-pixels are located above the source lines S1 to S4, respectively.

Similarly, the structure in case of (n≥4) can be also applied.

When the same simulation as the case of (n=1) about the cases of (n=2) and (n=3) was performed, as shown in FIG. 5, it turned out that the equation is approximated by a linear function in which the slope is the same as that shown in case of (n=1), and a value of a section falls at a fixed rate with the increase in "n". That is, when the number of the main pixel electrodes PA which are provided in the pixel electrode PE is set to "n", the range of the dielectric constant anisotropy permitted is as follows.

Δ∈≥−0.014×(definition)+(19.7−4(n−1))

By having found out the above relational expression, it becomes possible to easily draw the necessary value of the dielectric constant anisotropy with respect to the required definition. That is, while becoming possible to get desired display characteristics by applying materials having the dielectric constant anisotropy which satisfies the above-mentioned expression with respect to the definition, it becomes possible to obtain desired display characteristics in stable condition while suppressing the increase in power consumption.

Moreover, since it is not necessarily the cases that the materials having all the dielectric constant anisotropy values can be prepared, if the material which has the dielectric constant anisotropy value required in the case of (n=1) with respect to the definition cannot be prepared, the dielectric constant anisotropy value in the case of the pixel structure of (n=2) can be used. In the case, it becomes easy to prepare the materials because the dielectric constant anisotropy value falls using the pixel structure in the case of (n=2). For example, when the definition is 400 ppi, in the case of the pixel structure (n=1), it is necessary to prepare the materials having the dielectric constant anisotropy value of 14 or more. However, when preparation of the material whose dielectric constant anisotropy value is about 10 is possible while preparation of the materials having the dielectric constant anisotropy value of 14 or more is difficult, it becomes possible to get required display performance (luminosity) by changing the pixel structure to that in the case of (n=2). That is, it becomes possible to perform selection of the substitute materials and to make the change of the pixel structure easily by using the above-mentioned relational expression.

Hereinafter, the modifications according to the embodiments are explained.

The counter substrate CT may be further equipped with a sub-common electrode which constitutes the common electrode CE. The sub-common electrode is integrally or continuously formed with the main common electrode CA. The sub-common electrode extends along the first direction X, and is formed so that it may be located above the gate line G. When applying the counter substrate CT equipped with the common electrode CE including the main common electrode and the sub-common electrode, the pixel electrode PE is located on the inner side surrounded with the common electrode CE in the shape of lattice.

Moreover, the array substrate AR may be further equipped with a first shield electrode. The first shield electrode is set to the same potential as that of the main common electrode CA and extends along the first direction X. The first shield electrode is formed so that it may counter with each of the gate lines G. By providing the first shield electrode, it is possible to shield undesirable electric field from the gate line G. For this reason, it becomes possible to control degradation of the display grace.

In addition, the array substrate AR may be further equipped with a second shield electrode. The second shield electrode is set to the same potential as that of the main common electrode CA and extends along the second direction Y. The second shield electrode is formed so that it may counter with each of the source lines S. By providing the second shield electrode, it is possible to shield undesirable electric field from the source line S. Therefore, it becomes possible to control degradation of the display grace. The second shield electrode is combinable with the first shield electrode. When applying the array substrate AR equipped with the first shield electrode and the second shield electrode, the pixel electrode PE is arranged on the inner side surrounded with the first shield electrode and the second shield electrode.

Moreover, it is possible to mutually replace the arrangement of the pixel electrode PE and the common electrode CE in the above-mentioned embodiments. That is, the pixel is provided with "n" common electrodes CE extending in the second direction Y and the pixel electrode extending in the second direction Y on both sides which sandwich each of the common electrodes. In this case, the pixel electrode is arranged at the both ends of each pixel, and the common electrode CE and the pixel electrode PE are arranged by turns.

As explained above, according to the embodiments, it becomes possible to supply the liquid crystal display device which can control degradation of display grace.

While certain embodiments have been described, these embodiments have been presented by way of embodiment only, and are not intended to limit the scope of the inventions. In practice, the structural elements can be modified without departing from the spirit of the invention. Various embodiments can be made by properly combining the structural elements disclosed in the embodiments. For embodiment, some structural elements may be omitted from all the structural elements disclosed in the embodiments. Furthermore, the structural elements in different embodiments may properly be combined. The accompanying claims and their equivalents are intended to cover such forms or modifications as would fall within the scope and spirit of the inventions.

What is claimed is:

1. A liquid crystal display device, comprising:
    a first substrate including:
        a gate line and an auxiliary capacitance line respectively extending in a first direction,
        a source line extending in a second direction orthogonally crossing the first direction,
        a switching element electrically connected with the gate line and the source line,
        a pixel electrode including a sub-pixel electrode electrically connected with the switching element and extending in the first direction in the shape of a belt, and "n" main pixel electrodes electrically connected with the sub-pixel electrode and extending in the second direction ("n" is positive integer),
        a first alignment film covering the pixel electrode, and
    a second substrate including:
        a common electrode having a main common electrode extending in the second direction in parallel with the "n" main pixel electrodes,
        a second alignment film covering the common electrode, and
    a liquid crystal layer held between the first substrate and the second substrate and including liquid crystal molecules; wherein
    dielectric constant anisotropy $\Delta c$ of the liquid crystal molecules satisfies a following relational expression with respect to a definition depending on an inter-electrode distance between the main pixel electrode and the main common electrode adjacent to each other in the first direction, $\Delta \in \geq -0.014 \times (\text{definition}) + (19.7 - 4(n-1))$, in which "definition" is a number of unit pixels arranged per 1 inch (2.54 cm) in length.

2. The liquid crystal display device according to claim 1, wherein the sub-pixel electrode is arranged above the auxiliary capacitance line.

3. The liquid crystal display device according to claim 1, wherein initial alignment direction of the liquid crystal molecules is in parallel with the second direction, and the liquid crystal molecules are aligned in a splay alignment state or a homogeneous alignment state between the first substrate and the second substrate when electric field is not formed between the pixel electrode and the common electrode.

4. The liquid crystal display device according to claim 3, further comprising a first polarization plate formed on an outer surface of the first substrate and including a first polarizing axis and a second polarization plate formed on an outer surface of the second substrate and including a second polarizing axis in a Cross Nicol positional relation with the first polarizing axis, wherein the first polarizing axis of the first polarization plate is arranged in parallel with or orthogonally crossing the initial alignment direction of the liquid crystal molecules.

5. The liquid crystal display device according to claim 4, wherein the main common electrode is arranged above the source line in case of (n=1).

6. The liquid crystal display device according to claim 4, wherein the common electrode arranged between the main pixel electrodes crosses the sub-pixel electrode in case of (n≥2).

7. A liquid crystal display device, comprising:
a first substrate including:
a gate line and an auxiliary capacitance line respectively extending in a first direction,
a source line extending in a second direction orthogonally crossing the first direction,
a switching element electrically connected with the gate line and the source line,
a pixel electrode having a sub-pixel electrode electrically connected with the switching element and extending in the first direction in the shape of a belt, and "n" main pixel electrodes electrically connected with the sub-pixel electrode and extending in the second direction ("n" is positive integer),
a first alignment film covering the pixel electrode, and
a second substrate including:
a common electrode having a main common electrode extending in the second direction in parallel with the "n" main pixel electrodes,
a second alignment film covering the common electrode, and
a liquid crystal layer held between the first substrate and the second substrate and including liquid crystal molecules; wherein
the sub-pixel electrode is arranged above the auxiliary capacitance line,
initial alignment direction of the liquid crystal molecules is in parallel with the second direction, and the liquid crystal molecules are aligned in a splay alignment state or a homogeneous alignment state between the first substrate and the second substrate when electric field is not formed between the pixel electrode and the common electrode,
the liquid crystal display device further comprises a first polarization plate formed on an outer surface of the first substrate and including a first polarizing axis and a second polarization plate formed on an outer surface of the second substrate and including a second polarizing axis in a Cross Nicol positional relation with the first polarizing axis, wherein the first polarizing axis of the first polarization plate is arranged in parallel with or orthogonally crossing the initial alignment direction of the liquid crystal molecules,
dielectric constant anisotropy $\Delta\varepsilon$ of the liquid crystal molecules satisfies a following relational expression with respect to a definition depending on an inter-electrode distance between the main pixel electrode and the main common electrode adjacent to each other in the first direction, $\Delta\varepsilon \geq -0.014\times(\text{definition})+(19.7-4(n-1))$, in which "definition" is a number of unit pixels arranged per 1 inch (2.54 cm) in length.

8. The liquid crystal display device according to claim 7, wherein the main common electrode is arranged above the source line in case of (n=1).

9. The liquid crystal display device according to claim 7, wherein the main common electrode arranged between the main pixel electrodes crosses the sub-pixel electrode in case of (n≥2).

10. A liquid crystal display device, comprising a plurality of pixel units arranged in a matrix of a first direction and a second direction orthogonally crossing the first direction, the pixel unit including a red sub-pixel, a green sub-pixel and a blue sub-pixel, and the length of the pixel unit in the first direction being substantially the same as that in the second direction, wherein the red sub-pixel, the green sub-pixel and the blue sub-pixel respectively includes:
a first substrate including:
a gate line and an auxiliary capacitance line respectively extending in the first direction,
a source line extending in the second direction,
a switching element electrically connected with the gate line and the source line,
a pixel electrode having a sub-pixel electrode electrically connected with the switching element and extending in the first direction in the shape of a belt, and "n" main pixel electrodes electrically connected with the sub-pixel electrode and extending in the second direction ("n" is positive integer),
a first alignment film covering the pixel electrode, and
a second substrate including:
a common electrode having a main common electrode extending in the second direction in parallel with the "n" main pixel electrodes,
a second alignment film covering the common electrode, and
a liquid crystal layer held between the first substrate and the second substrate and including liquid crystal molecules; wherein
dielectric constant anisotropy $\Delta c$ of the liquid crystal molecules satisfies a following relational expression with respect to a definition depending on an inter-electrode distance between the main pixel electrode and the main common electrode adjacent to each other in the first direction, $\Delta\varepsilon \geq -0.014\times(\text{definition})+(19.7-4(n-1))$, in which "definition" is a number of unit pixels arranged per 1 inch (2.54 cm) in length.

11. The liquid crystal display device according to claim 10, wherein the sub-pixel electrode is arranged above the auxiliary capacitance line.

12. The liquid crystal display device according to claim 10, wherein initial alignment direction of the liquid crystal molecules is in parallel with the second direction, and the liquid crystal molecules are aligned in a splay alignment state or a homogeneous alignment state between the first substrate and a second substrate when electric field is not formed between the pixel electrode and the common electrode.

13. The liquid crystal display device according to claim 10, further comprising a first polarization plate formed on an outer surface of the first substrate and including a first polarizing axis and a second polarization plate formed on an outer surface of the second substrate and including a second polarizing axis in a Cross Nicol positional relation with the first polarizing axis, wherein the first polarizing axis of the first polarization plate is arranged in parallel with or orthogonally crossing an initial alignment direction of the liquid crystal molecules.

14. The liquid crystal display device according to claim 13, wherein the main common electrode is arranged above the source line in case of (n=1).

15. The liquid crystal display device according to claim 13, wherein the main common electrode arranged between the main pixel electrodes crosses the sub-pixel electrode in case of (n≥2).

* * * * *